United States Patent [19]

Nakamura et al.

[11] 4,346,966
[45] Aug. 31, 1982

[54] COMPACT LENS SYSTEM OPERABLE IN DIFFERENT MEDIUMS

[75] Inventors: Akiyoshi Nakamura, Sakai; Toshinobu Ogura, Tondabayashi; Masahide Tanaka, Toyonaka, all of Japan

[73] Assignee: Minolta Camera Co., Ltd., Daisen-Nishimachi, Japan

[21] Appl. No.: 167,119

[22] Filed: Jul. 9, 1980

[30] Foreign Application Priority Data

Jul. 16, 1979 [JP] Japan ............... 54-90512

[51] Int. Cl.$^3$ ................................ G02B 9/64
[52] U.S. Cl. ............................ 350/412; 350/463
[58] Field of Search ............ 350/412, 418, 459, 463

[56] References Cited

U.S. PATENT DOCUMENTS 3,586,419  6/1971  Wakimoto et al. .......... 350/418
3,904,275  9/1975  Noguchi et al. ............ 350/175

FOREIGN PATENT DOCUMENTS 2224429  12/1972  Fed. Rep. of Germany ...... 350/459
1238668   7/1971  Japan .
48-2823   7/1973  Japan .
50-21749  8/1975  Japan .

OTHER PUBLICATIONS

Optical Problems Under Water by Y. Shimizu and Y. Matsui (Lens used with spherical shell).

*Primary Examiner*—F. L. Evans
*Assistant Examiner*—Rebecca D. Gass
*Attorney, Agent, or Firm*—Jackson, Jones & Price

[57] ABSTRACT

The present invention is directed to a compact lens system equally operable in both air and water, comprising a first lens group having a front surface directly facing the air or water medium, the center of the curvature of the front surface being located approximately at the entrance pupil of the lens system, and a second lens group located at the image side of the first lens group with an air space formed between the first and second lens groups. The air space and design parameters being selected in the lens system so that the field curvature of the lens system is mainly changed without any substantial change in other aberrations when the air space is changed, wherein the air space is changeable by a predetermined value in response to the change between use in air and use under water for maintaining a relatively flat image surface.

9 Claims, 20 Drawing Figures

-1.0 1.0
Spherical Aberration

-1.0 1.0
Astigmatism

-5 5
Distortion

Spherical Aberration

Astigmatism

Distortion

Spherical Aberration

Astigmatism

Distortion

FIG.5
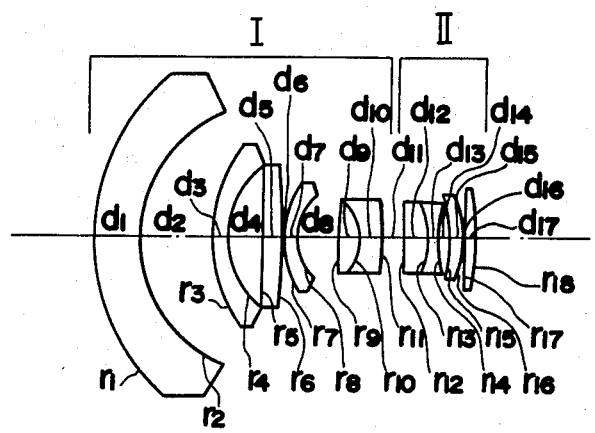
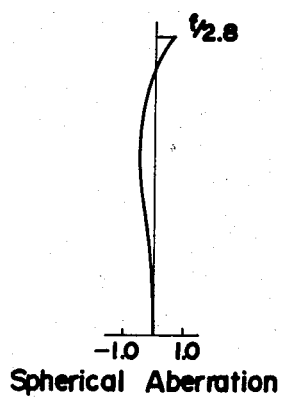
Spherical Aberration
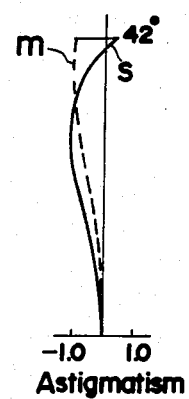
Astigmatism
Distortion Spherical Aberration Astigmatism Distortion Spherical Aberration Astigmatism Distortion

COMPACT LENS SYSTEM OPERABLE IN DIFFERENT MEDIUMS

BACKGROUND OF THE INVENTION

1. Field of the Invention

The present invention relates to a compact lens system capable of forming images with minimal aberrations, even when the medium which transmits light to the front surface of the lens system is changed, for example, from air to water.

2. Description of the Prior Art

Photography, in an environment other than air, has been suggested in the prior art for a considerable period of time. An example of such work is disclosed in an article published in Photographic Industries on July 1, 1973, entitled "Optical Problems Under Water" by Shimizu et al.

Attempts have been made in the medical field of endoscopes to accommodate them to both a gas and liquid environment as set forth in the Laid-Open Japanese Patent Application No. 50-21749 (1975).

As is well known, the aberrations of a lens system generally change if the medium, which transmits light to the lens system, is changed since the refractive index and Abbe number at the object side of the front surface of the lens system changes. For example, the aberration correction of a lens system which is achieved for exclusive use in air would be greatly disturbed if the lens system is used under water, or the aberration correction of a lens system which is achieved for exclusive use under water would be greatly disturbed if the lens system is used in air.

Therefore, suggestions in the prior art to design a lens system for dual use in air and water have been to take a mean course between aberration corrections for exclusive use in air and for exclusive use under water. Thus, the degree of disturbance of aberrations from a fine corrected condition would be decreased to a half in comparison with the case of aberration correction with respect to exclusive use in air if the lens system is used under water, and vice versa. Such lens systems show an almost identical optical performance both in air and water. It is apparent, however, that the optical performance of such a lens system cannot be superior to an exclusive lens system which is designed for use only in air or under water.

Additionally, the above described prior art would be only successful when the field angle of the lens system is narrow and the lens system is of limited speed, since disturbance of aberration correction is tolerable under such conditions.

The following patents are cited of general interest, British Pat. No. 1,238,668, U.S. Pat. No. 3,904,275, the Japanese publicly available published patent application disclosure No. 48-2823, and the German Offenlegungsschrift No. 2224429.

SUMMARY OF THE INVENTION

An object of the present invention is to provide an improved compact lens system in which the aberration correction is maintained even if the medium which transmits light to the front surface of the lens system is changed.

Another object of the present invention is to provide a relatively high speed lens system of a relatively wide field angle greater than sixty degrees for use in different mediums.

A further object of the present invention is to provide an improved lens system capable of dual use in air and under water for mounting on a camera.

The present invention can be further defined by the following conditions:

(1) $0.09 < (N-1) F/r_1 < 0.38$
(2) $0.3 < DA/DB < 3.1$
(3) $-0.3 < F/F_1 < 0.2$
(4) $X > 0.05F$ wherein N represents the refractive index of an object side medium other than air; F is the focal length of the whole lens system when facing an air medium; $r_1$ is the radius of curvature of the front surface; DA represents the combined axial thickness of the front lens component ($d_1$) plus the first air space ($d_2$) between the front lens component and the second lens component; DB represents the axial distance between the object side surface ($r_3$) of the second lens component and the entrance pupil; $F_1$ represents the focal length of the front lens component when facing an air medium and X represents the change in the air space between lens groups in response to a change between an air medium and another medium of refractive index N.

The objects and features of the present invention which are believed to be novel are set forth with particularity in the appended claims. The present invention, both as to its organization and manner of operation, together with further objects and advantages thereof, may best be understood by reference to the following description, taken in connection with the accompanying drawings.

BRIEF DESCRIPTION OF THE DRAWINGS

FIG. 5 represents a schematic view of a second embodiment of the present invention;

FIGS. 6a, 6b and 6c, and FIGS. 7a, 7b and 7c represent graphic plots of the various aberrations of the second embodiment.

DESCRIPTION OF THE PREFERRED EMBODIMENTS

The following description is provided to enable any person skilled in the optical art to make and use the present invention and sets forth the best modes contemplated by the inventors of carrying out their invention. Various modifications however, will remain readily apparent to those skilled in the art, since the generic principles of the present invention have been defined herein specifically to provide a lens system capable of directly facing different mediums.

The derivation of the specific parameters of the lens embodiments disclosed herein can be accomplished with the assistance of a computer. The present invention represents the parameters of a compromise balance of acceptable aberrations in a relatively easily manufactured lens assembly. The data presented in the Tables, to be discussed subsequently, are more than adequate to permit a competent artisan in the optical art to reproduce the embodiments of the present invention.

In the accompanying drawings, which supplement the following Tables, the lenses in accordance with the present invention, are illustrated schematically. As usual, in conventional lens diagrams, the light is assumed to travel from left to right.

In the Tables, the radii of curvature of the lenses are indicated by the letter, r, with a subscript corresponding to the consecutive surfaces of the lens elements from left to right. The minus (−) signs indicate surfaces concave toward the object side, while the surfaces without a sign are convex toward the object side. The Tables also disclose the axial spacings with the letter, d, again with a subscript indicating the distance consecutively from the left to right. The axial spacings will include both the thickness of the lens and the air spaces and in this regard, the value of the axial spacings between the lens elements are appropriately positioned relative to the values of the radius of curvature to indicate whether the axial distances are an air space or a thickness of the lens. All linear dimensions are given in relative values to an equivalent focal length of $f=100$ with the lens system used in the air. The Tables also provide, with respect to each embodiment, the field angle $2\omega$, the F number and the back focal distance Bf with the lens system used in air. The refractive index is designated as N, while the Abbe number is $\nu$.

Figure 1:
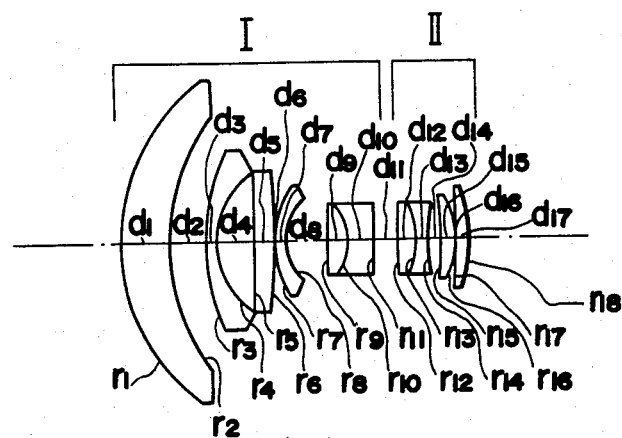
FIG. 1 represents a schematic view of a first embodiment of the present invention.

As apparent from FIGS. 1 and 5, a lens system capable of directly interfacing with different mediums according to the present invention comprises a first lens group (I) having a front surface ($r_1$) directly facing a medium which transmits light to the lens system. The center of the curvature of the front surface ($r_1$) is located approximately at the entrance pupil of the lens system, and a second lens group (II) located at the image side of the first lens group (I) with an air space ($d_{11}$) formed between the first and second lens groups. The air space ($d_{11}$) is selected in the lens system so that the field curvature of the lens system is primarily changed without any substantial change in other aberrations when the air space is changed, wherein the air space ($d_{11}$) is changeable by a predetermined value in response to any change in the medium facing the front surface ($r_1$) for maintaining a relatively flat image surface irrespective of the change in the medium.

In the above structure, any one of the first and second lens groups may include another variable air space, such an additional air space may be so selected that the field curvature of the lens system is mainly changed without any substantial change in other aberrations when the additional air space is changed. Accordingly, two or more air spaces can be jointly changed in response to a change in the medium facing the front surface of the lens system.

In the present invention, all the off-axial rays are incident on the front surface ($r_1$) almost perpendicularly since the center of curvature of the front surface ($r_1$) is located approximately at the entrance pupil of the lens system. This means that any change in refraction of light rays at the front surface ($r_1$) is minimized even if the medium at the object side of the front surface ($r_1$) changes to alter the refractive power of the front surface ($r_1$). In particular, this structure is effective to avoid any change in distortion and chromatic aberration (particularly, lateral chromatic aberration) occurring with a change in the medium at the object side of the front surface, e.g., water to air and vice versa.

The changeable air space ($d_{11}$) is capable of nullifying the change in field curvature with a change in medium. The refractive power of the front surface ($r_1$) greatly changes in response to a change in medium at the object side thereof since the front surface ($r_1$) has a curvature convex to the object side. This change in refractive power of the front surface affects the power balance of the lens system to change the field curvature. For example, if the field curvature of a lens system is suitably corrected for use under water, the field curvature would result in an insufficiently corrected condition if the lens system is used in air, because of the increased positive refractive power of the front surface which is convex to the object side. On the contrary, a lens system in which the field curvature is suitably corrected for use in air would show an excessively corrected field curvature if the lens system is used under water, because of the decreased positive refractive power of the front surface of the lens system. The variable air space ($d_{11}$) of the present invention corrects this change in field curvature while the other aberrations are substantially unchanged.

If the above mentioned change in refractive power of the front surface is the only desired design factor to be considered with a change in the medium, than the lens system could be improved by making the front surface as flat as possible, since a flat surface has no refractive power regardless of the change in medium on both sides thereof. On the other hand, a flat front surface introduces off-axial rays obliquely to it. Therefore, the angle of refraction at the flat front surface would greatly change in accordance with the change in medium at the object side of the flat surface. Therefore, a lens system, having a flat front surface, in which the distortion and chromatic abertation are well corrected with respect to use under water, would show a poor correction of distortion and chromatic aberration in air, and vice versa.

In summary, the present invention avoids the change in distortion and chromatic aberration with a change in medium by means of a front surface, the center of curvature of which is located at the entrance pupil of the lens system. The change in field curvature in response to the change in medium, which results from the adoption of a curved front surface, is avoided by the changeable air space. The air space is designed to provide a first predetermined value to make the field curvature substantially flat when used in air and is set to a second predetermined value to make the field curvature substantially flat when used under water.

The lens system of the present invention can, of course, be used in any third medium other than air and water, e.g., oil, if the variable air space is set to a third predetermined value to make the field curvature substantially flat in use in the third medium, e.g., oil.

The present invention can be further defined by the following conditions:

(1) $0.09 < (N-1) F/r_1 < 0.38$
(2) $0.3 < DA/DB < 3.1$
(3) $-0.3 < F/F_1 < 0.2$
(4) $X > 0.05F$ wherein N represents the refractive index of an object side medium other than air; F is the focal length of the whole lens system when facing an air medium; $r_1$ is the radius of curvature of the front surface; DA represents the combined axial thickness of the front lens component ($d_1$) plus the first air space ($d_2$) between the front lens component and the second lens component; DB represents the axial distance between the object side surface ($r_3$) of the second lens component and the entrance pupil; $F_1$ represents the focal length of the front lens component when facing an air medium and X represents the change in the air space between lens groups in response to a change between an air medium and another medium of refractive index N.

With regard to Condition (1), it is important to maintain the lower limit in order to ensure that the system can be compact enough, for example, on small camera bodies. The upper limit of Condition (1) is necessary to ensure the proper correction of off-axial aberrations. In Condition (2), the upper limit is again necessary to maintain the desired compactness in the lens design while the lower limit must be maintained to decrease the zonal astigmatic difference when correcting the field curvature for different mediums. The lower limit of Condition (3) is necessary to correct astigmatism, distortion and coma, while the upper limit is necessary to ensure sufficient illumination of the zonal to marginal image areas of the lens system. Finally, Condition (4) is necessary to provide an effective correction of the field curvature.

TABLE 1

(Embodiment)
$f = 100$  $F_{No.} = 2.8$  $2\omega = 84°$  $Bf = 150.63$

| | Radius of Curvature | Axial Distance | Refractive Index | Abbe Number |
|---|---|---|---|---|
| | $r_1$ 171.03 | | | |
| | | $d_1$ 41.09 | Nd 1.5168 | νd 64.1 |
| | $r_2$ 179.92 | | | |
| | | $d_2$ 30.00 | | |
| | $r_3$ 168.11 | | | |
| | | $d_3$ 9.85 | Nd 1.6204 | νd 60.3 |
| | $r_4$ 69.13 | | | |
| | | $d_4$ 31.19 | | |
| | $r_5$ 4993.76 | | | |
| | | $d_5$ 16.60 | Nd 1.6710 | νd 51.8 |
| I | $r_6$ −367.63 | | | |
| | | $d_6$ 0.99 | | |
| | $r_7$ 86.66 | | | |
| | | $d_7$ 8.10 | Nd 1.6204 | νd 60.3 |
| | $r_8$ 43.80 | | | |
| | | $d_8$ 36.46 | (Including entrance pupil) | |
| | $r_9$ 273.25 | | | |
| | | $d_9$ 19.38 | Nd 1.6700 | νd 39.2 |
| | $r_{10}$ −42.88 | | | |
| | | $d_{10}$ 20.00 | Nd 1.5657 | νd 43.0 |
| | $r_{11}$ −239.36 | | | |
| | | $d_{11}$*(See below) | | |
| | $r_{12}$ 554.91 | | | |
| | | $d_{12}$ 19.43 | Nd 1.6204 | νd 60.3 |
| | $r_{13}$ −86.13 | | | |
| | | $d_{13}$ 8.39 | Nd 1.7618 | νd 26.6 |
| | $r_{14}$ 179.69 | | | |
| | | $d_{14}$ 10.64 | | |
| II | $r_{15}$ −192.35 | | | |
| | | $d_{15}$ 9.65 | Nd 1.7080 | νd 53.2 |
| | $r_{16}$ −83.54 | | | |
| | | $d_{16}$ 0.69 | | |
| | $r_{17}$ 1973.94 | | | |
| | | $d_{17}$ 13.00 | Nd 1.6214 | νd 61.3 |
| | $r_{18}$ −124.53 | | | |

*$d_{11}$ = 18.21 (in air), or 9.50 (under water)

TABLE 2

(Embodiment 2)
$f = 100$  $F_{No.} = 2.8$  $2\omega = 84°$  $Bf = 151.78$

| | Radius of Curvature | Axial Distance | Refractive Index | Abbe Number |
|---|---|---|---|---|
| | $r_1$ 173.00 | | | |
| | | $d_1$ 41.09 | Nd 1.5168 | νd 64.1 |
| | $r_2$ 115.15 | | | |
| | | $d_2$ 60.83 | | |
| | $r_3$ 130.87 | | | |
| | | $d_3$ 9.85 | Nd 1.6204 | νd 60.3 |
| | $r_4$ 73.97 | | | |
| | | $d_4$ 31.19 | | |
| | $r_5$ 4784.46 | | | |
| | | $d_5$ 16.60 | Nd 1.6710 | νd 51.8 |
| I | $r_6$ −373.71 | | | |
| | | $d_6$ 0.99 | | |
| | $r_7$ 88.96 | | | |
| | | $d_7$ 8.10 | Nd 1.6204 | νd 60.3 |
| | $r_8$ 46.72 | | | |
| | | $d_8$ 36.46 | (Including entrance pupil) | |
| | $r_9$ 197.83 | | | |
| | | $d_9$ 19.38 | Nd 1.6700 | νd 39.2 |
| | $r_{10}$ −46.47 | | | |
| | | $d_{10}$ 20.00 | Nd 1.5657 | νd 43.0 |
| | $r_{11}$ −232.55 | | | |
| | | $d_{11}$*(See below) | | |
| | $r_{12}$ 5561.43 | | | |
| | | $d_{12}$ 19.43 | Nd 1.6204 | νd 60.3 |
| | $r_{13}$ −96.51 | | | |
| | | $d_{13}$ 8.39 | Nd 1.7618 | νd 26.6 |
| | $r_{14}$ 181.44 | | | |
| | | $d_{14}$ 10.64 | | |
| II | $r_{15}$ −175.92 | | | |
| | | $d_{15}$ 9.65 | Nd 1.7080 | νd 53.2 |
| | $r_{16}$ −78.61 | | | |
| | | $d_{16}$ 0.69 | | |
| | $r_{17}$ 734.01 | | | |
| | | $d_{17}$ 11.33 | Nd 1.6214 | νd 61.3 |
| | $r_{18}$ −161.40 | | | |

*In Air $d_{11}$ = 18.21
Under Water $d_{11}$ = 10.00

Tables 1 and 2 disclose the first and second embodiments of the present invention, respectively. FIGS. 1 and 5 correspond to the first and second embodiments, respectively. As apparent from the Tables and Figures, in each of the embodiments, the first lens group (I) is defined between the front surface ($r_1$) and a surface ($r_{11}$) facing the changeable air space ($d_{11}$) with the relative positions of the optical elements ($r_1$ to $r_{11}$) in the first lens group (I) unchanged, while the second lens group (II) is defined between another surface ($r_{12}$) facing the changeable air space ($d_{11}$) and the rear surface ($r_{18}$) of the lens system with the relative positions of the optical elements ($r_{12}$ to $r_{18}$) in the second lens group (II) unchanged.

Figure 2A:
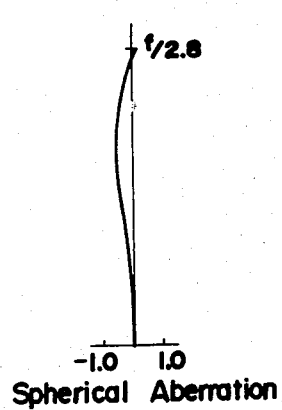
FIGS. 2a, 2b and 2c, and FIGS. 3a, 3b and 3c represent graphic plots of the various aberrations of the first embodiment.
Figure 2B:
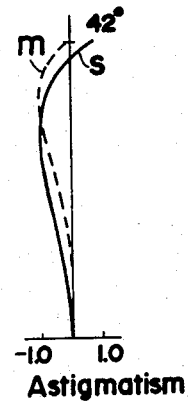
Figure 2C:
Figure 3A:
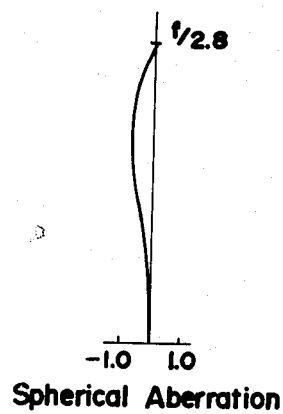
Figure 3B:
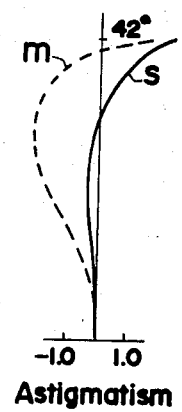
Figure 3C:
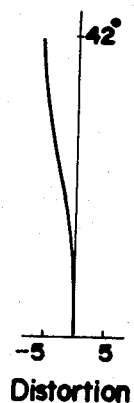

FIGS. 2a and 2c represent various aberrations of the first embodiment when used in air, while FIGS. 3a to 3c correspond to those used under water. Those Figures prove that a relatively high speed ($F_{NO}=2.8$) lens system of a relatively wide field angle ($2\omega=84°$), in which a high degree of aberration correction is maintained even if the medium is changed, can be provided by the present invention. Such a remarkable compact lens system has not heretofore been provided in the prior art.

Figure 4A:
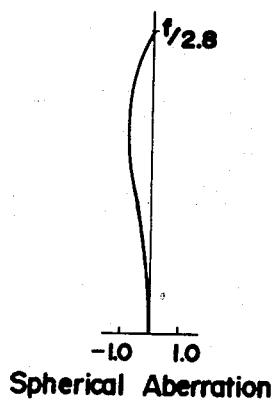
FIGS. 4a, 4b and 4c represent reference graphic plots of the various aberrations in relation to the first embodiment.
Figure 4B:
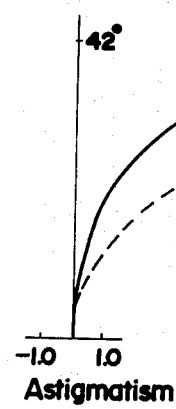
Figure 4C:

FIGS. 4a to 4c are reference aberration curves with respect to the first embodiment. These aberration curves are for the first embodiment when used under water with the variable air space fixed at a value $d_{11}=18.21$, which is set for use in air. FIG. 4b shows that the field curvature is in an excessively corrected condition. On the other hand, it is apparent that the field curvature will be in an insufficiently corrected condition in a great degree if the first embodiment is used in air with the variable air space fixed at a value, $d_{11}=9.50$, which is for use under water, although aberration curves are not shown.

In the present invention, it should be noted that the back focal distance of the lens system is changed in response to the change in medium at the object side of the lens system because the focal length of the lens system changes. Namely, the back focal distance Bf of the first embodiment is 150.63 when used in air, while Bf=166.49 in case of use under water. Therefore, it is necessary to shift the lens system by a predetermined value in cooperation with the change in the variable air space. This is achieved in the first embodiment in the following manner. The first lens group (I) is shifted towards the object side by 7.15 and the second lens group (II) is shifted towards the object side by 15.86 if the lens system is changed from the use in air to the use under water. Thus, the changeable air space is changed from 18.21 to 9.50 and the back focal distance is changed from 150.63 to 166.49. In case of changing the lens system from the use under water to the use in air, the first and second lens groups are shifted in reverse, respectively.

The above shift of the lens groups can be simplified in a specific lens design in which the necessary changes in the changeable air space and the back focal distance are equal, i.e., $\Delta d_{11} = -\Delta Bf$, wherein $\Delta d_{11}$ and $\Delta Bf$ are changes of $d_{11}$ and Bf, respectively. In other words, only the second lens group (II) is shifted by a predetermined value with the first lens group (I) left stationary in this case, since the shift of the second lens group (II) can achieve both the necessary changes in the changeable air space and the back focal distance.

Figure 7A:
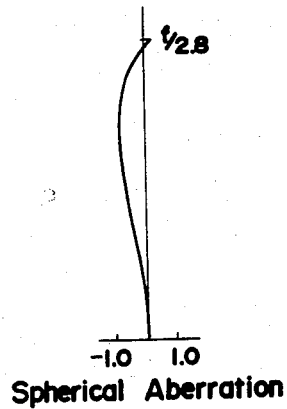
Figure 7B:
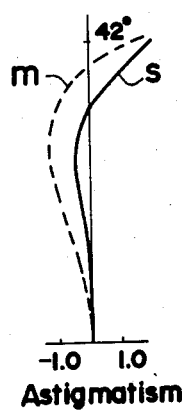
Figure 7C:
Figure 8A:
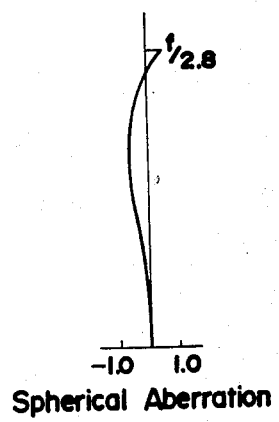
FIGS. 8a, 8b and 8c represent reference graphic plots of the various aberrations in relation to the second embodiment.
Figure 8B:
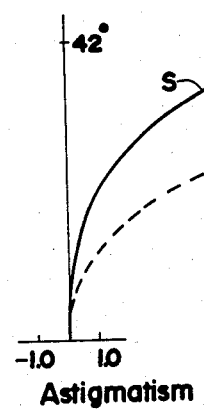
Figure 8C:
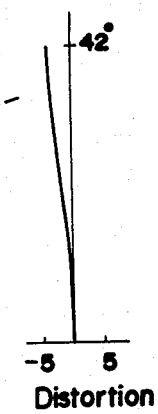

FIGS. 6a to 6c relate to the second embodiment when used in air, while FIGS. 7a to 7c are for use under water. Further, FIGS. 8a to 8c relate to the aberrations of the second embodiment in which the lens system is used under water with the changeable air space $d_{11}$ fixed at a value for use in air. These Figures can be understood in the same manner as described with regard to the above FIGS. 2a to 4c.

In the second embodiment, the back focal distance is 151.78 for use in air, and 167.49 for use under water. Therefore, the first lens group (I) is shifted by 7.50 and the second lens group (II) by 15.71 towards the same direction in response to the change between the use in air and the use under water.

As is apparent from the above embodiments, the present invention successfully provides a compact lens system in which lens elements are tightly arranged with aberrations well corrected both in air and water.

While the above embodiments have been disclosed as the best modes presently contemplated by the inventors, it should be realized that these examples should not be interpreted as limiting, because artisans skilled in this field, once given the present teachings, can vary from these specific embodiments.

Accordingly, the scope of the present invention should be determined solely from the following claims in which we claim:

1. A compact lens system of optical elements capable of adapting to different mediums comprising;
  a first lens group having a front surface directly facing a medium which transmits light to the lens system, the center of curvature of the front surface being located approximately at the entrance pupil of the lens system; and
  a second lens group operatively connected to and located at the image side of the first lens group with an air space formed between the first and second lens groups, the air space being selected in the overall design of the lens system so that the field curvature of the lens system can be changed without any substantial change in other aberrations by variation of the air space, wherein the air space is changeable by a predetermined value to adjust for the change in the medium adjacent the front surface to maintain a relatively flat image surface irrespective of the change in the medium.

2. The invention of claim 1, further including means for changing the back focal distance of the lens system by a predetermined value in cooperation with the change in the air space in response to the change in the medium facing the front surface.

3. The invention of claim 2, wherein the first lens group is defined between the front surface and a surface facing the changeable air space with the relative positions of the optical elements in the first lens group unchanged, while the second lens group is defined between another surface facing the changeable air space and the rear surface of the lens system with the relative positions of the optical elements in the second lens group unchanged, and wherein at least the second lens group is shiftable along the optical axis by a predetermined value in response to a change in the medium facing the front surface to change the variable air space and the back focal distance.

4. The invention of claim 3, wherein the first lens group is further shiftable along the optical axis by a predetermined value, which is different from that of the shift of the second lens group, in response to a change in the medium facing the front surface to change the variable air space and the back focal distance.

5. The invention of claim 1, wherein the predetermined values by which the air space is changed relate to a first medium, air and a second medium, water.

6. The invention of claim 1, wherein the changeable air space is approximately twice as large for an air medium as for a water medium.

7. The invention of claim 1 wherein the first lens group includes at least a first and second component spaced by a first air space and the lens system satisfies the following conditions:
  (1) $0.09 < (N-1) F/r_1 < 0.38$
  (2) $0.3 < DA/DB < 3.1$
  (3) $-0.3 < F/F_1 < 0.2$
  (4) $X > 0.05F$ wherein N represents the refractive index of the object side medium other than air; F is the focal length of the whole lens system when facing an air medium; $r_1$ is the radius of curvature of the front surface; DA represents the combined axial thickness of the front component plus the first air space between the front component and the second component; DB represents the axial distance between the object side surface of the second component and the entrance pupil; $F_1$ represents the focal length of the front component when facing an air medium and X represents the change in the air space between lens groups in response to a change between an air medium and another medium of refractive index N.

8. A compact lens system adaptable for photography in air and water environments comprising the following design parameters;

| | Radius of Curvature | Axial Distance | Refractive Index | Abbe Number |
|---|---|---|---|---|
| | $f = 100$ $F_{No.} = 2.8$ | $2\omega = 84°$ | $Bf = 150.63$ | |
| I | $r_1$ 171.03 | | | |
| | | $d_1$ 41.09 | Nd 1.5168 | νd 64.1 |
| | $r_2$ 179.92 | | | |
| | | $d_2$ 30.00 | | |
| | $r_3$ 168.11 | | | |
| | | $d_3$ 9.85 | Nd 1.6204 | νd 60.3 |
| | $r_4$ 69.13 | | | |
| | | $d_4$ 31.19 | | |
| | $r_5$ 4993.76 | | | |
| | | $d_5$ 16.60 | Nd 1.6710 | νd 51.8 |
| | $r_6$ −367.63 | | | |
| | | $d_6$ 0.99 | | |
| | $r_7$ 86.66 | | | |
| | | $d_7$ 8.10 | Nd 1.6204 | νd 60.3 |
| | $r_8$ 43.80 | | | |
| | | $d_8$ 36.46 | (Including entrance pupil) | |
| | $r_9$ 273.25 | | | |
| | | $d_9$ 19.38 | Nd 1.6700 | νd 39.2 |
| | $r_{10}$ −42.88 | | | |
| | | $d_{10}$ 20.00 | Nd 1.5657 | νd 43.0 |
| | $r_{11}$ −239.36 | | | |
| | | $d_{11}$*(See below) | | |
| II | $r_{12}$ 554.91 | | | |
| | | $d_{12}$ 19.43 | Nd 1.6204 | νd 60.3 |
| | $r_{13}$ −86.13 | | | |
| | | $d_{13}$ 8.39 | Nd 1.7618 | νd 26.6 |
| | $r_{14}$ 179.69 | | | |
| | | $d_{14}$ 10.64 | | |
| | $r_{15}$ −192.35 | | | |
| | | $d_{15}$ 9.65 | Nd 1.7080 | νd 53.2 |
| | $r_{16}$ −83.54 | | | |
| | | $d_{16}$ 0.69 | | |
| | $r_{17}$ 1973.94 | | | |
| | | $d_{17}$ 13.00 | Nd 1.6214 | νd 61.3 |
| | $r_{18}$ −124.53 | | | |

*$d_{11}$ = 18.21 (in air), or 9.50 (under water)

9. A compact lens system adaptable for photography in air and water environments comprising the following design parameters;

| | Radius of Curvature | Axial Distance | Refractive Index | Abbe Number |
|---|---|---|---|---|
| | $f = 100$ $F_{No.} = 2.8$ | $2\omega = 84°$ | $Bf = 151.78$ | |
| I | $r_1$ 173.00 | | | |
| | | $d_1$ 41.09 | Nd 1.5168 | νd 64.1 |
| | $r_2$ 115.15 | | | |
| | | $d_2$ 60.83 | | |
| | $r_3$ 130.87 | | | |
| | | $d_3$ 9.85 | Nd 1.6204 | νd 60.3 |
| | $r_4$ 73.97 | | | |
| | | $d_4$ 31.19 | | |
| | $r_5$ 4784.46 | | | |
| | | $d_5$ 16.60 | Nd 1.6710 | νd 51.8 |
| | $r_6$ −373.71 | | | |
| | | $d_6$ 0.99 | | |
| | $r_7$ 88.96 | | | |
| | | $d_7$ 8.10 | Nd 1.6204 | νd 60.3 |
| | $r_8$ 46.72 | | | |
| | | $d_8$ 36.46 | (Including entrance pupil) | |
| | $r_9$ 197.83 | | | |
| | | $d_9$ 19.38 | Nd 1.6700 | νd 39.2 |
| | $r_{10}$ −46.47 | | | |
| | | $d_{10}$ 20.00 | Nd 1.5657 | νd 43.0 |
| | $r_{11}$ −232.55 | | | |
| | | $d_{11}$*(See below) | | |
| II | $r_{12}$ 5561.43 | | | |
| | | $d_{12}$ 19.43 | Nd 1.6204 | νd 60.3 |
| | $r_{13}$ −96.51 | | | |
| | | $d_{13}$ 8.39 | Nd 1.7618 | νd 26.6 |
| | $r_{14}$ 181.44 | | | |
| | | $d_{14}$ 10.64 | | |
| | $r_{15}$ −175.92 | | | |
| | | $d_{15}$ 9.65 | Nd 1.7080 | νd 53.2 |
| | $r_{16}$ −78.61 | | | |
| | | $d_{16}$ 0.69 | | |
| | $r_{17}$ 734.01 | | | |
| | | $d_{17}$ 11.33 | Nd 1.6214 | νd 61.3 |
| | $r_{18}$ −161.40 | | | |

*In Air $d_{11}$ = 18.21
Under Water $d_{11}$ = 10.00

* * * * *